United States Patent [19]

Clyde et al.

[11] 4,251,239
[45] Feb. 17, 1981

[54] MULTI-PURPOSE CERAMIC ELEMENT

[76] Inventors: Robert A. Clyde, 6900 SW. 112 St., Miami, Fla. 33156; William B. Crandall, Snyder Rd., Alfred Station, N.Y. 14803

[21] Appl. No.: 937,085

[22] Filed: Aug. 28, 1978

Related U.S. Application Data

[63] Continuation-in-part of Ser. No. 914,610, Jun. 12, 1978, abandoned.

[51] Int. Cl.³ .............. B03C 3/62; C04B 21/08; B01D 39/20; B01J 35/04
[52] U.S. Cl. .................. 55/132; 55/154; 55/523; 55/528; 261/DIG. 72; 210/505; 210/510; 252/477 R; 425/198; 264/44
[58] Field of Search .......... 55/131, 154, 155, 490, 55/514, 523, 524, 528, DIG. 13, 132; 261/DIG. 72; 210/484, 496, 506, 508, 509, 505, 510; 425/198; 264/44; 521/918; 428/305, 306; 252/477 R

[56] References Cited

U.S. PATENT DOCUMENTS

| 553,994 | 2/1896 | Lea et al. ............... 210/496 |
| 3,235,089 | 2/1966 | Burroughs ............. 210/506 |
| 3,410,057 | 11/1968 | Lerner ..................... 261/94 |
| 3,458,338 | 7/1969 | Adams et al. ........... 55/524 |
| 3,487,610 | 1/1970 | Brown et al. ........... 55/155 |
| 3,524,548 | 8/1970 | McDonald et al. ....... 210/496 |
| 3,746,642 | 7/1973 | Bergstrom ............. 210/496 |
| 3,788,486 | 1/1974 | Bergstrom ............. 210/496 |
| 3,796,657 | 3/1974 | Pretorios et al. ...... 261/94 |
| 3,998,758 | 12/1976 | Clyde .................... 261/DIG. 72 |
| 4,028,275 | 6/1977 | Sakai et al. ............ 252/477 R |
| 4,152,183 | 5/1979 | Honacker ............... 55/154 |

FOREIGN PATENT DOCUMENTS

| 2503681 | 8/1975 | Fed. Rep. of Germany ... 261/DIG.72 |
| 3466 | of 1891 | Sweden .................. 261/94 |
| 883876 | 12/1961 | United Kingdom ......... 55/155 |
| 1142800 | 2/1969 | United Kingdom ......... 252/477 R |

Primary Examiner—David L. Lacey
Attorney, Agent, or Firm—Pitts & Kesterson

[57] ABSTRACT

A ceramic sponge made from plastic is described. Because of the ease of cutting the plastic in various shapes before converting to ceramic several unique applications are possible. In case of a column packing better contact between liquid and gas is made. For an auto catalytic converter better contact between gas and catalyst is realized. By cutting in other ways a filter to remove solids is made, permitting longer use before clogging, also a scrubber to remove particulates. A rotary ceramic filter is described; it is also a composite of fibers and ceramic which retains small particulates without excessive pressure drop upon passage of fluid through the filter. An acid resistant collector plate for an electrostatic precipitation is described.

13 Claims, 15 Drawing Figures

MULTI-PURPOSE CERAMIC ELEMENT

This is a continuation-in-part of application Ser. No. 914,610, filed June 12, 1978 now abandoned.

FIELD OF THE INVENTION

This invention relates to a new and improved porous ceramic packing element useful in various mass transfer operations, also in a new type catalyst support, filter, scrubber, and electrostatic precipitator. In each case, the object is formed by making internal passageways inside a polyurethane foam and then converting the polyurethane to ceramic in the same shape. Fibers can be inserted in the internal passageways to catch small particulates. The ceramic sponge supplies support to a structurally weaker and finer filter when vacuum or pressure is applied.

BACKGROUND OF THE INVENTION

Packed columns are normally utilized in mass transfer operations which involve gas-liquid contact such as distillation and absorption processes. In operation, a liquid is usually introduced at the top of the column and flows over a packing material contained within the column. Usually, a gas is introduced at the bottom of the column and flows through the column countercurrently to the liquid. The packing material increases the intimacy of contact between the two phases thereby facilitating the transfer of material from the gas phase to the liquid phase or vice versa.

Several factors are involved in providing a packed column with a relatively high operating efficiency. Included among these factors are the column temperature and temperature gradient, column pressure and pressure drop, column size, the method of introducing the phases into the column, relative flow rates of the phases, the manner in which the column is packed, etc. Of particular importance is the selection of the packing material utilized. The packing material should be constructed in such a manner that it contributes minimally to the pressure drop across the column. Moreover, it should be chemically inert with respect to the phases which it contacts. It should also have high mechanical durability, be relatively nonabsorbent and impervious to the phases passing through the column, and should be heat and corrosion resistant.

Packing materials are available in many shapes, materials and sizes. Perhaps the most common shapes are rings and saddles such as Raschig rings, Pall rings, Ballast rings, Flexirings, Hy-Pak rings, Cascade Mini-Rings, Berl saddles, Intalox saddles, etc. These packing materials are made from a wide variety of metals, plastics, glass or ceramics and there are several advantages associated with the use of each type. Ceramics, for example, are resistant to many corrosive materials, have a low coefficient of expansion and generally are not otherwise effected by high temperatures. However, many of the prior art ceramic materials are relatively heavy and have a relatively low void space. Even the improved ceramic materials such as Intalox saddles weigh approximately 38 pounds per cubic foot and contain only 80% void space. DuPont Torvex cross flow described in U.S. Pat. Nos. 3,338,995 and 3,255,027 weighs 32 pounds per cubic foot and has only 75% void fraction. From an engineering standpoint, heavier materials are undesirable since they require the use of stronger support plates in a column which in turn could be a significant factor in causing column flooding (i.e., a condition wherein liquid will not flow freely through the column). Under usual conditions, stronger support plates are provided by eliminating some of the open areas in the plate and replacing these areas with metal to increase the strength of the plate. Under any circumstances, it is technically desirable for the support to have a greater open area than the packing in order for the support area not to be the critical region in the development of an undesirable flooding condition. Often times it is difficult to avoid this condition where heavy packing material is utilized. Thus, it is apparent that flooding may be correlated to the percentage of void space inherent in the packing material, i.e., as percentage of void space increases (and weight of the material decreases), the possibility of flooding decreases. For the foregoing reasons, it is frequently desirable to employ packing materials with relatively high void space.

Up until the recent past, packing materials have been designed with a relatively large surface area in order to provide a film of liquid for the gas to contact since it was believed that the most efficient mass transfer could take place in this manner. More recently, however, it has been observed that the coefficient of mass transfer from a gas to liquid droplets is 10 to 13 times greater than from a gas to a flat surface (Chemical Engineers Handbook, Perry 5th Ed., p. 18–42). As a result of these observations, packing materials have been designed to promote droplet formation. Typical of the packing materials designed to enhance droplet formation are Super Intalox saddles (Norton Company), each of which contains two scalloped edges having about 18 apexed points to facilitate droplet formation (see U.S. Pat. No. 3,232,589 to Eckert). Other trends in the design of improved packing materials are described in U.S. Pat. No. 3,493,218 to Castellucci, U.S. Pat. No. 3,167,600 to Worman, and U.S. Pat. No. 3,796,657 to Pretorius et al. Pretorius is not relevant because he stresses "uniformity" of cross section. U.S. Pat. No. 3,962,081 of Yarwood also mentions "structural uniformity" in claim 1. The effectiveness of the present invention is based on non-uniformity (i.e. internal voids). U.S. Pat. No. 3,748,828 of Lefebore involves liquid running down threads of yarn. This, of course, will not stand high temperatures. In Mr. Eckert's packing, the efficiency of the packing material is somewhat limited by the limited number of scallops available for droplet formation and the lack of sharp and clearly defined points. To be effective the scallops must be pointed down and in random packing they will be pointed up half the time. In U.S. Pat. No. 3,410,057 to Lerner, the packing material is similar to this invention, but the shape and purpose is different. The purpose of Lerner's patent is to separate liquid and gas and keep them separate, as noted in the following exerpts:

"Returns the disentrained liquid through flow channels established entirely within the confines of the porous bodies . . . " "All backflow or drainage of liquid occurs through the porous bodies . . . " "The voids . . . remain free to transmit gas flow." "A method of disentraining . . . "

The purpose of the column packing is not to keep the gas and liquid separate, but just the opposite—to contact them for better mass transfer. It is not to keep the liquid inside the porous bodies, but rather to make the liquid drip through the voids. It is not to keep voids free to transmit gas flow, but rather to cause liquid to drip through the voids. For this different purpose, a different design is necessary.

A big disadvantage of Lerner's shapes as shown in his FIG. 9 and described in column 2, line 50 (shaped so as to insure mostly point and line contact) is that the weight of the packing above will break the points. A further disadvantage (column 6, line 57—surfaces at random inclination) is that when the angle is too great, liquid flows inside the packing instead of dripping through the void and contacting the gas.

A serious disadvantage of random packing is that when a metal column heats and expands, the packing settles. When it is shut down or cools the column then contracts, crushing the packing and causing high pressure drop. In Lerner's claim 3 he mentions a gas-liquid contact device in conjunction with horizontal plates. The plates are not required in this invention.

In many scrubbers to remove small solid particulates the gas with particulates travels horizontally through a packed bed while liquid flows down. A disadvantage of previous packings is that the gas has a high pressure drop to force it through the packing. The packing of this invention has low pressure drop.

Sponge type catalyst supports have been described in Robert Clyde's U.S. Pat. Nos. 3,900,646 and 3,998,758. These are very desirable because they mix gases, but one disadvantage is that they have higher pressure drop than parallel hole types. Parallel holes do not mix gases, and if a hot spot (from platinum, for example) develops in the metal coating, it dissipates only along the hole, since ceramic is an insulator, resulting in the catalyst promoting a different reaction at the higher temperature. It would be very desirable if a catalyst support could be developed that had low pressure drop, promoted turbulence, mixed gases, and dissipated heat in a zag-zag fashion.

Schwartzwalder's U.S. Pat. No. 3,090,094 mentions that porous ceramics make good high temperature filters, but one big disadvantage is that they clog so quickly. Hot particulates from burning coal and from diesel engines could be removed if a method were found to hold more solids before clogging. A plume from an airplane results in an enemy being able to track it. Solids from diesel combustion are also thought to be carcinogenic. Heat exchangers are much less efficient when fouling occurs. It would be very desirable if a high temperature filter that held more solids and in which organic material could be burned out and inorganic material cleaned out with acid, could be devised. U.S. Pat. No. 3,948,623 of Ostly et al describes a high temperature air filter for foundries but it is made of metal and will not stand over 2000° F.

U.S. Pat. No. 3,873,281 of Himes et al describes a flexible plastic filter that will not withstand high temperature or corrosive acids. A thin structurally weak fine filter can be put between two layers of a strong ceramic filter on the outside of a cylinder so it can withstand internal vacuum (during liquid filtration) or pressure (during pulse cleaning). The internal filter is thin to keep a low pressure drop.

In some cases particles are too small to be retained by a filter. Scientists at Lawrence Berkely Lab (Chem-Eng. News Mar. 20 '78, pg. 19) believe that invisible soot particles catalyze $SO_2$ oxidation. It would be very desirable if an ESP (electrostatic precipitator) could be devised with more area than a flat plate.

Mr. Karl Springer of South West Research Institute reported June 27, 1978 at the Air Pollution conference in Houston that glass fibers can remove Diesel soot. To have an entire filter of such fibers, however might cause excessive pressure drop because particulates are very small (about ½ micron). In a composite filter of this invention the tortuous path of the gases will impinge solids on the fibers without a high pressure drop. By spreading out the solids in this "in depth" filtration, they don't block flow of the gases.

Several U.S. Pat. Nos. 3,893,917, 3,962,081, 4,052,198, 4,081,371, 4,024,056, 4,056,586, 4,024,212, and 3,947,363 for filtering molten aluminum have been assigned to Swiss Aluminum. In each case, however, a flat sponge is used. A wave form top however provides more area for filtration, and moreover, rapid clogging is avoided and the useful life extended. In this embodiment although solids may coat the glass or ceramic fibers and fill a substantial portion of the trough, the crest zone would still function. If this amount of solids were put on a flat sponge it would clog quickly. U.S. Pat. No. 4,052,198, claim 5, mentions a coarse filter and a fine filter but does not mention the great advantage of exposing more area as shown in our FIG. 7, nor the advantage of having the principal filter in between as in FIG. 15, in which the sponge is merely the support for the filter. The main problem is Diesel exhaust or coal particulates is to remove very small particles (1 or 2 microns). For this a fine filter is required. To prevent high pressure drop it must be thin and for structural strength it needs support. Our embodiment involves internal passageways. U.S. Pat. No. 4,056,586 mentions a curved plate and hollow cylinder, claims 7 and 8. Our FIG. 1 is more than a simple curved plate.

As described in our FIG. 15 it is necessary to have two concentric cylinders (or one with internal passageways) one to support the filter during operation and one to support while back-washing or blowing.

U.S. Pat. No. 4,007,923, Chia, shows a filter with slightly more area than a plain flat plate. However, Chia does not have the applicant's unique feature of undulating walls with varying thickness, the thickness in the trough being thinner than in the crest. When the material filters down from the top, the thinner section of the sponge in the trough offers less resistance allowing the fluid to flow freely through the trough and depositing solids therein. Thus, when the trough is partly filled, the fluid will again take the path of least resistance and go through the side of the sponge just above the solids, leaving the solids to build up in the trough. In this manner, the filter will clog only when the trough is completely full. Chia does not offer this effect because when the solids start to form on the plain flat plates of the filter, there will be immediate resistance, thus the liquid will not be able to flow freely as in applicant's design.

U.S. Pat. No. 3,963,504, Lundsager, states in pertinent part in claim 1 that " . . . uniform channels of essentially rectangular cross section . . . varying in size from 0.025 to 0.20 inches . . . ". Although in applicant's FIGS. 1, 4, and 15, the internal voids are uniform; they are not rectangular. Further, in all cases the internal voids are greater than one-fifth of an inch. Moreover, in all embodiments, other than FIGS. 1, 4, and 15, it will be noted that the internal voids are irregular.

U.S. Pat. No. 3,911,070, another Lundsager invention, uniform channels are formed by extrusion. When the uniform channels are formed by extrusion, one cannot readily make a sponge body with tapered channels or make the outside dimensions in a shape of a cone rather than a cylinder. Thus, in applicant's device, a larger volume of gas can be accommodated. Moreover, the platinum used in the automobile catalytic converter causes an exothermic reaction which requires a larger volume. Thus, applicant's device is able to accommodate this larger volume of gases which ordinary devices could not.

U.S. Pat. No. 3,533,753, Berger, utilizes parallel channels as in claim 10 or intersecting channels as in claim 11. In either case, the gas must make a 90 degree turn, which means considerably more pressure drop than in applicant's design. The increased pressure drop means that more force is needed in order to send the gas through the catalytic converter. Thus, applicant's design is more efficient than that of Berger.

OBJECTS OF THE INVENTION

It is an object of this invention to provide a new and improved packing element.

It is another object of this invention to provide a ceramic packing element having a relatively high porosity.

It is a further object of this invention to provide a ceramic packing element which is relatively light in weight.

Still another object of this invention is to provide a ceramic packing element which increases mass transfer efficiencies by contacting gas and liquid, solid and liquid, or two liquids.

An additional object of this invention is to provide a ceramic packing element which is durable, strong, corrosion resistant and not adversely affected by high temperatures.

Yet another object of this invention is to provide a ceramic packing element which promotes turbulence.

It is another object of this invention to provide a catalyst support with low pressure drop.

It is a further object of this invention to provide a catalyst support in which hot spots dissipate.

Still another object of this invention is to provide a filter that will withstand high temperatures (over 2000° F.) and will hold more solids before clogging.

Another object of this invention is to provide a composite filter of small and larger openings which will catch small particulates without excessive pressure drop.

A further object of this invention is to provide a filter that can be cleaned continuously by rotating a drum or by back-flushing with air pressure.

Yet another object of this invention is to provide a filter that is corrosion resistant and will not clog quickly.

It is a further object of this invention to provide a high temperature scrubber that removes particulates from gas without causing a high pressure drop in the gas.

It is another object of this invention to provide support on both sides of a thin filter so that when vacuum or pressure is applied, the thin filter will not bend.

It is also an object of this invention to provide a corrosion resistant collective plate for an electro-static precipitator with more area than a metal plate.

SUMMARY OF THE INVENTION

These and other objects of the invention are obtained with a new and improved porous ceramic packing element which has internal horizontal passageways. Each of the internal pores are comprised of a peripheral ceramic filamentary wall which forms the pore opening. The pores are interconnected either by sharing a portion of the wall of an adjacent pore or by a connecting filament. The pores on the boundary of the internal passageways additionally contain cantilevered filamentary appendages each having an end attached to the pore wall while the remaining end is unattached. The unattached end of each of the cantilevered filamentary appendages which extend downward from the horizontal walls of the internal passageways terminates in a point which provides a locus for the formation of droplets. These droplets come into intimate contact with gas moving up the passageway. Some gas will also contact liquid inside the body of the sponge.

The new and improved ceramic packing elements described herein are light, strong, durable at high temperatures, corrosion resistant, provide improved mass transfer efficiencies and have little or no adverse effects on pressure drops or flooding characteristics when used in columns.

A new and improved catalyst support in which gas travels through the sponge in a corkscrew fashion combines the mixing action of the plain sponge, and its ability to transfer heat with the low pressure drop of the parallel hole type.

Instead of a plain surface filter, a fluted filter with more area has been devised. It will hold more solids before clogging. The ceramic is corrosion resistant and will withstand high temperatures. In this application the passageways are tapered (larger on the inlet side) so pressure drop can be adjusted according to volume passing through.

GENERAL DESCRIPTION OF THE DRAWINGS

Figure 9:
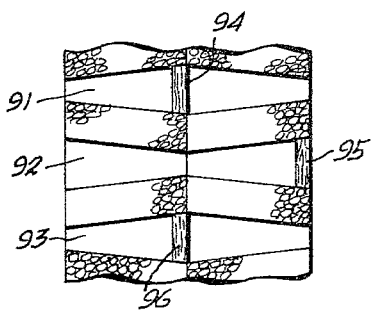
Figure 10:
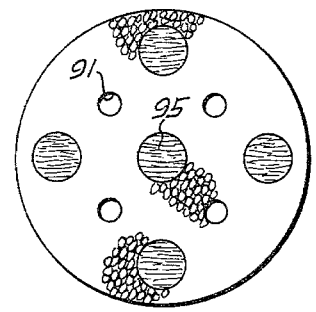
Figure 13:
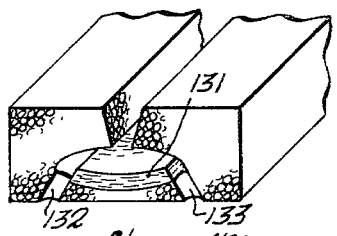
Figure 11:
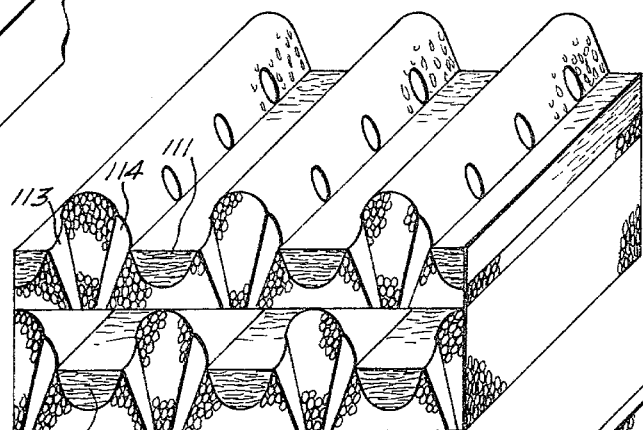
Figure 14:
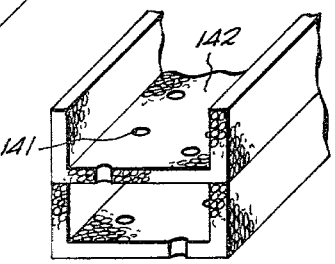
Figure 15:
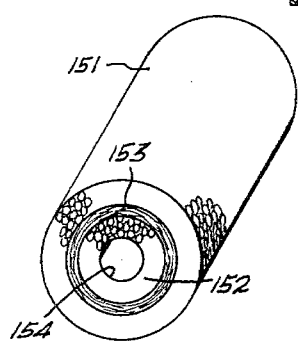
Figure 12:
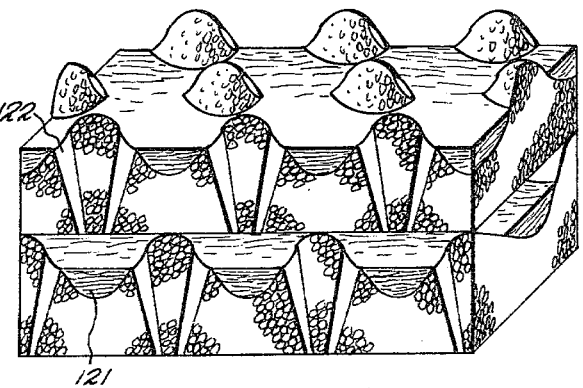

FIG. 9 shows tapered holes in a ceramic sponge. Gas enters at points 91, 92 and 93 and the decrease in cross section causes an increase in velocity so heavier solid particulates will impinge upon the finer filter 94, 95 and 96;

FIG. 10 shows an end view of FIG. 9;

FIG. 11 shows the wave form ceramic sponge with fine filters 111 and 112 in the troughs or valleys. Tapered holes 113 and 114 can have the same Venturi effect of increasing velocity. The filter can be cleaned by replacing glass fibers or the filter can be on the outside of a rotary drum and the bottom section of the filter can be continuously cleaned by back-washing with detergent, air, or acid. In case of expensive particulates, they can be recovered;

FIG. 12 is another design. Instead of parallel valleys as in FIG. 11, the low spots are in individual locations and contain fine filters 121. Tapered holes 122 can increase velocity of particulates;

FIG. 13 shows another composite. Gas enters the top. Particulates impinge on the filter 131 and gas exits through the holes 132 and 133;

FIG. 14 shows a design of a scrubber using a viscous fluid such as molten glass which drips down the hole 141 and dissolves coal particulates going to a turbine. Some glass seeps through the sponge body 142. FIG. 14 without holes 141 can also be used as a filter or column packing;

FIG. 15 shows a cylinder with voids 153 and 154. Void 153 is filled with a fine filter which catches small particulates. The fine filter 153 can consist of fiber glass, ceramic fiber or the like. The function of the inner sponge 152 is to support filter 153 during operation (pressure on outside or vacuum on inside) and the function of outer sponge 151 is to support during cleaning when pressure is applied inside. Filter 153 can retain particles smaller than the 100 pores per inch mentioned in U.S. Pat. No. 4,056,586, claim 1. In larger units strengthening ribs may be required between sponges 151 and 152.

DESCRIPTION OF THE PREFERRED EMBODIMENT

Figure 1:
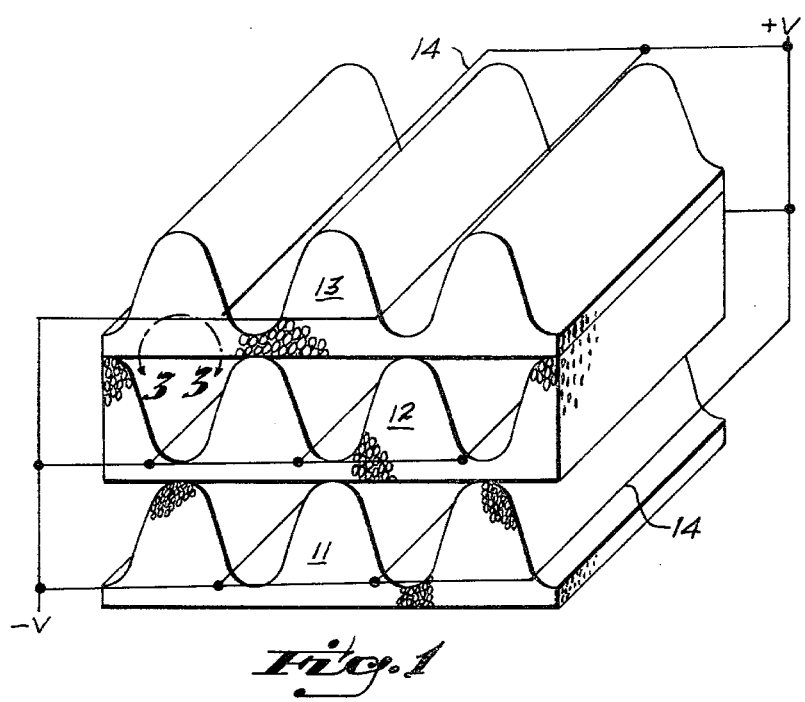
FIG. 1 shows a square section of column packing or scrubber. It can also be a filter.
Figure 2:
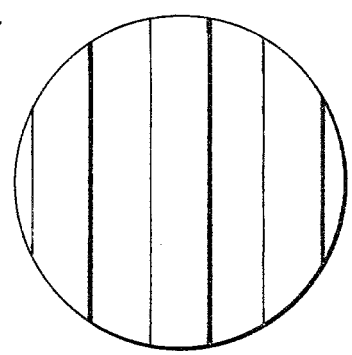
FIG. 2 shows a top view of a circular column packing or scrubber, or filter.

Polyurethane foam is easily cut in the shape of the lower section 11, FIG. 1, by feeding the plastic horizontally into a horizontal knife which makes two sections at once. While the knife is cutting a crest in the lower section, it is cutting a trough in the upper section. As the plastic moves into the knife, rollers on the top push the plastic down so a wave form is formed. In this design all the rollers at the points where the plastic is being cut are pushing the same. Another design could be made where one roller is pushing up and the one behind is pushing down as shown in FIG. 12. This would result in the plastic contacting the top piece (when the top piece is inverted) in points instead of ridges, which would look like a number of eggs touching and standing on end. A hot wire can be used to cut the trough wider at the bottom.

After the two pieces of plastic are cut (one a mirror image of the other) the top piece is inverted and placed on top of the other so that the crest of the top is above the trough of the lower one, just as piece 12 is placed on top of 11. Another piece 13 can be placed on top of 12, all the sections dipped into a ceramic slurry, and squeezed to remove excess material so that only the sponge fibers are coated. The coated sponge is then dried and heated to the maturing temperature of the ceramic material and then cooled. The final element of this invention is comprised of the selected ceramic material which may be chosen from virtually any one of numerous such materials including crystalline types such as porcelain, mullite, alumina, zirconia, zicron, cordierite, fosterite, spodumene, perovskite, steatite, magnesia, silicon carbide, silicon nitride, beryllia and the like, as well as the glassy types such as borosilicates, sodalime, flint, plate, alumina silicate, silica (quartz) and the like.

The elements of this invention can be further treated to increase efficiency and/or durability. Thus, the elements may contain a wash coat to increase effective surface area as more fully described in SAE Paper 730276 (1973) and in "DISPAL M", A Unique, New And Versatile Alumina For The Ceramic Industry" presented by Robert J. Butler at the 24th Pacific Coast Regional Metting of the American Ceramic Society (Nov. 2, 1971). A smooth wash coat such as terra sigilatta or high area wash coat such as gamma alumina, glazes, wallastonite, diatomaceous earth, or fine glass fibers, all attached using gamma alumina or the like, can be applied. Durability of the elements can be improved by plating metal on top of the ceramic or wash coat by conventional means or by vapor deposition as described in Robert Clyde's U.S. Pat. Nos. 3,900,646 or 3,998,758.

An advantage of vapor deposition is that metal goes on pore free so that, for example, caustic down a scrubber would not attack ceramic.

A nickel coated filter could be used to catch glass from a glass melting furnace and then the glass could be removed with caustic.

Figure 3:
FIG. 3 shows an enlarged view of area 33 from FIG. 1 with liquid droplets falling off the points.

Advantages of this new design are numerous. In Eckert's design a 2" size has only 18 scallops and they are pointed down only half the time in random dumping into a column. In the new design of this invention there are hundreds of points as shown in FIG. 3 for droplet formation and they are pointed downward since the packing is made in large pieces and placed that way in the column. As gas moves up the column through the open space which is the trough, it comes into intimate contact with the drops 31 falling down. Ths promotes high mass transfer. The packing is very light and puts less stress on support plates which means that the support plates can be more open and do not contribute to flooding.

Figure 4:
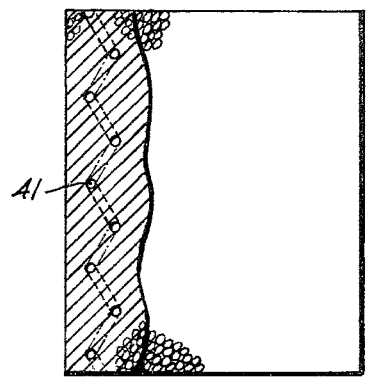
FIG. 4 shows a catalyst support with corkscrew passageways.
Figure 5:
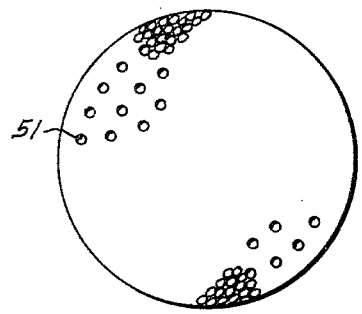
FIG. 5 shows a top view of FIG. 4 with the corkscrew openings.

FIG. 4 shows a catalyst support such as might be used in an auto as a catalytic converter. Parallel hole monoliths do not provide good mixing of the gases, and streamline flow results in a stationary film next to the wall which results in poor contact. A plain sponge provides good mixing but more pressure drop. Gases can mix after only one pore diameter (1/10" or less). In DuPont Torvex cross flow gases must travel through parallel holes for the thickness of the section (over 1") before partial mixing. By putting a corkscrew hole item 41 by means of a hot corkscrew or cutter, through the plastic before it is converted to ceramic, pressure drop is reduced and turbulence is still maintained. This plastic is converted to ceramic in a similar manner as previously described and can be made of many different ceramics. FIG. 5 shows a top view with the corkscrew holes 51. A precombustion catalyst that mixes fuel and air results in less carbon formation in a jet engine, according to Captain Thomas Rosfjord at Wright Patterson Air Force Base. According to an article in *Aviation Week and Space Technology,* Nov. 3, 1975, page 46, a precombustion catalyst results in 30% fuel savings.

Figure 6:
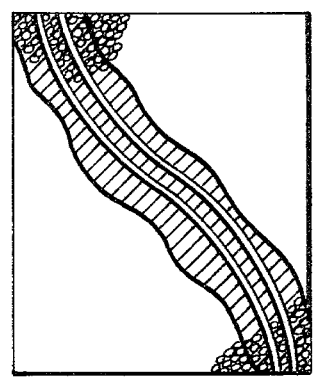
FIG. 6 shows a catalyst support that would result if the plastic sponge were twisted and a hole put through, and then allowed to untwist.

Referring to FIG. 6 there is shown a catalyst support which is made by twisting the plastic sponge and wherein a hole is put through it, and then it is allowed to untwist, with the result that a spiral passageway is provided.

Figure 7:
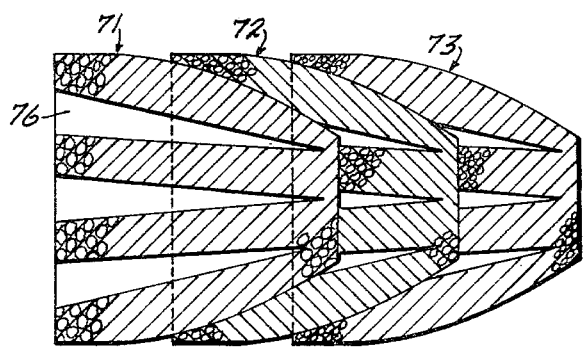
FIG. 7 shows a filter with tapered openings so that when particulates enter from the left the larger sizes will be caught in the larger openings, then the medium sized particulates caught in the middle section and fine ones caught in last section.

FIG. 7 shows a multiple filter. The first section on the left item 71 could consist of a sponge with 10, 20, or 30 pores per lineal inch. The middle section 72 could be 40, 50, or 60 pores per inch, and the last section 73 could be 70, 80, or 90 pores per inch. The tapered holes, 76 can be put in the plastic before conversion to ceramic. They allow for more solids to be collected before plugging.

Figure 8:
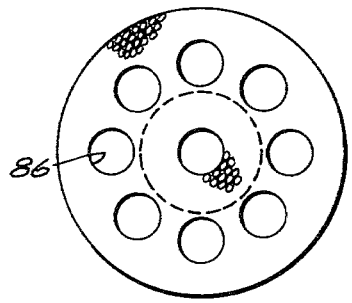
FIG. 8 shows an end view of FIG. 7.

FIG. 8 shows an end view with the tapered holes, item 86.

A flat filter as shown in FIG. 1 could also be used, with the top piece 13 consisting of larger holes and a perforated plate under the bottom section to permit the clean gas or liquid to pass through from top to bottom. The wave form could also be put in a circle.

Wires 14 could also be put through the troughs of FIG. 1 and a voltage impressed between the wires and the sponge so that an electrostatic precipitator is formed. In this case, the sponge should be made of a conductive material, such as perovskite, or it could be coated with a metal. This design would provide much more area for particulate collection than the conventional flat plate. Corrosion from acids is a problem when $SO_2$ gas is cleaned prior to oxidation to $SO_3$; also when chlorides are present. An air tube for cleaning could be in the center, item 154, FIG. 15 and the electrodes can be in the annular space 153. Electrodes could also be put through the five larger openings of FIG. 10 and air for cleaning put through the four smaller openings. In this embodiment there would be no constriction (items 94, 95 and 96) and the holes would not be tapered.

USES

The column packing could be used whenever intimate contact is desired between a gas and liquid or two fluids.

The porous ceramic elements of this invention are especially useful for packing distillation, extraction and absorption columns. Specific applications include scrubbing to reduce pollution from coal and other sources, oxygenating water used in the manufacture of cheese, beer on waste treatment, oxygenation of cyclohexane, etc. While various sizes and shapes have been herein mentioned for the porous ceramic packing elements which are the subject of this invention, it is within the skill of the art to select particular forms which are most suitable for specific applications. Instead of straight horizontal troughs a tortuous path could be made.

The catalyst support with corkscrew passageways would be very useful as an auto catalytic converter or as a precombustion catalyst for a piston engine, or turbine.

The high temperature filter would be very useful to remove the soot from a diesel engine, which is thought to be carcinogenic. It could also remove the soot from an airplane or satellite, or the particulates from steel manufacture. An electrostatic precipitator could also be used in these applications, in addition to removing particulates from coal combustion, or even invisible soot.

FIG. 1 and FIG. 14 can also be used as a scrubber to remove particulates which go horizontally through the trough openings while liquid drips downward and removes the fine particles from the gas.

The invention has been described in detail with particular reference to preferred embodiments thereof, but it will be understood that variations and modifications can be effected within the spirit and scope of the invention.

In summary, it is thus seen that there is provided a ceramic sponge body which is adapted to be positioned in spanning relation of a conduit to serve as a bed through which fluid flowing in the conduit is constrained to pass. The body comprising the bed is composed of a network of randomly located interconnected closely adjacent ceramic filaments. There is thus defined a plurality of interconnected closely adjacent cavities within the body which permits fluid flow through the bed with a substantial pressure drop across the bed and wherein there is presented to fluid flowing in the conduit a flow path which is partially obstructed by many ceramic filaments. It will further be appreciated that the body comprising the bed is provided with a plurality of internal voids and, importantly, these voids are arranged in a predetermined definite pattern within the body with each void having an upstream face and a downstream face and there being a substantial surface area about each void and within the body composed of a multiplicity of closely spaced terminal end zones of the ceramic filaments comprising the network. It is thus seen that the internal voids each comprises an unobstructed internal zone at a predetermined definite location which reduces the substantial pressure drop of fluid passing through the bed in relation to what would be the case if the internal voids were not provided and wherein the pressure drop may be controlled by the number, size and configuration of the internal voids. For example, in FIG. 1, if the upper surface of that part designated by the numeral 13 and the lower surface of that part designated by the numeral 11 are considered to be upstream and downstream faces of the body, it will be seen that the voids extend across or horizontally of the body. On the other hand, if the surfaces in which the numerals 11, 12 and 13 appear comprise the upstream surface and the opposite surface of the body comprises the downstream surface, the flow through path will be along the channels extending from face to face. As shown in the embodiment of FIG. 4, the unobstructed path through the body extends between the upstream surface, that is the upper surface, and the downstream surface, that is the lower surface, which is also the case with respect to the embodiment shown in FIG. 6. In the case of the embodiment shown in FIG. 7, the voids extend in a direction between the upstream and downstream surfaces and are tapered terminating at successive zones spanned completely by the network of ceramic filaments.

By making a composite of glass or ceramic fiber with sponge, fine particles can be filtered without excessive pressure drop. The particles are caught in the small openings of the fiber while the gas is by-passed through larger openings of sponge as in FIGS. 9, 10, 11 and 12.

A rotary filter with this type of construction can be cleaned continuously, thus eliminating shutdowns. In the operation of a rotary filter vacuum is often employed on the inside of the drum but the filter itself is not strong enough so a porous acid resistant back-up plate is required inside the filter. If pressure is applied outside, the same inside back-up plate is necessary. When cleaning, pressure is sometimes applied from the inside, so a support is needed also on the outside of the filter. Thus, a rotary ceramic sponge sandwich with the filter between the two layers as shown in FIG. 15 would be very effective.

Mr. Michael Shackelton of the Acurex Co. in a paper entitled "Barrier Filtration For High Temperature High Pressure Particulate Control" given at a conference in Denver July 25, 1978, sponsored by the Environmental Protection Agency, described problems where the stainless screen around the outside of a cartridge filter broke. A cartridge filter usually has pressure on the outside during operation and on the inside during cleaning so a high temperature corrosion resistant support is needed on both sides of the filter, as in FIG. 15. In a Diesel truck one filter could be operational while the other is being cleaned with air pressure on the inside. Mr. Tom Baines of the Environmental Protection Agency reported at a meeting in Houston on June 28, 1978 that Diesel trucks emit 80,000 metric tons/year of particulates and that of the 54 filter media tested by Arthur D. Little Co., one of the best was teflon on fiberglass. Gases can be cooled before going to the filter by a heat exchanger.

What is claimed is:

1. A ceramic ceramic element for positioning in a spanning relation of a conduit as a bed through which fluid flowing in the conduit is constrained to pass, and comprising:

a ceramic sponge body having an upstream face and a downstream face, and including a network of randomly located interconnected closely adjacent ceramic filaments defining a plurality of interconnected cavities suitable for providing a tortuous fluid flow path through the bed, which fluid flow path is partially obstructed by the ceramic filaments; and said ceramic sponge body having a plurality of internal voids of a predetermined definite pattern, each of said voids having an upstream zone and a downstream zone and the surface area surrounding each void being composed of a multiplicity of closely spaced terminal end zones of said ceramic filaments and said voids providing substantially an unobstructed selected pathway at predeterminal definite locations in said ceramic sponge bed to reduce the pressure drop of the fluid passing through the bed to a predetermined amount.

2. The ceramic element as set forth in claim 1 where said plurality of voids are provided in the bed extending in a direction between the upstream and downstream faces.

3. The ceramic element as set forth in claim 2 wherein the voids are spaced from one another between the upstream and downstream faces.

4. The ceramic element as set forth in claim 3 wherein the voids are parallel to one another.

5. The ceramic element as set forth in claim 2 wherein the voids extend between the upstream and downstream surfaces.

6. The ceramic element as set forth in claim 5 wherein the voids comprise continuous unobstructed passageways.

7. The ceramic element as set forth in claim 6 wherein the passageways are of a spiral shape.

8. The ceramic element as set forth in claim 1 wherein the internal voids are partially filled with a filter material of a finer nature than said ceramic sponge body.

9. The ceramic element as set forth in claim 1 wherein the internal voids are completely filled with filter material of a finer nature than said ceramic sponge body.

10. The ceramic element as set forth in claim 1 wherein means are provided adjacent said ceramic sponge body to charge particles causing the particles to adhere to the sponge body.

11. The ceramic element as set forth in claim 1 wherein the internal voids are larger than 0.25 inches.

12. The ceramic element as set forth in claim 1 wherein the internal voids are curved.

13. The ceramic element as set forth in claim 1 wherein the sponge body is coated with a catalytic metal.

* * * * *